Sept. 10, 1968 Y. R. ÅKESSON 3,400,740
VEGETABLE TRIMMING APPARATUS
Filed July 6, 1966
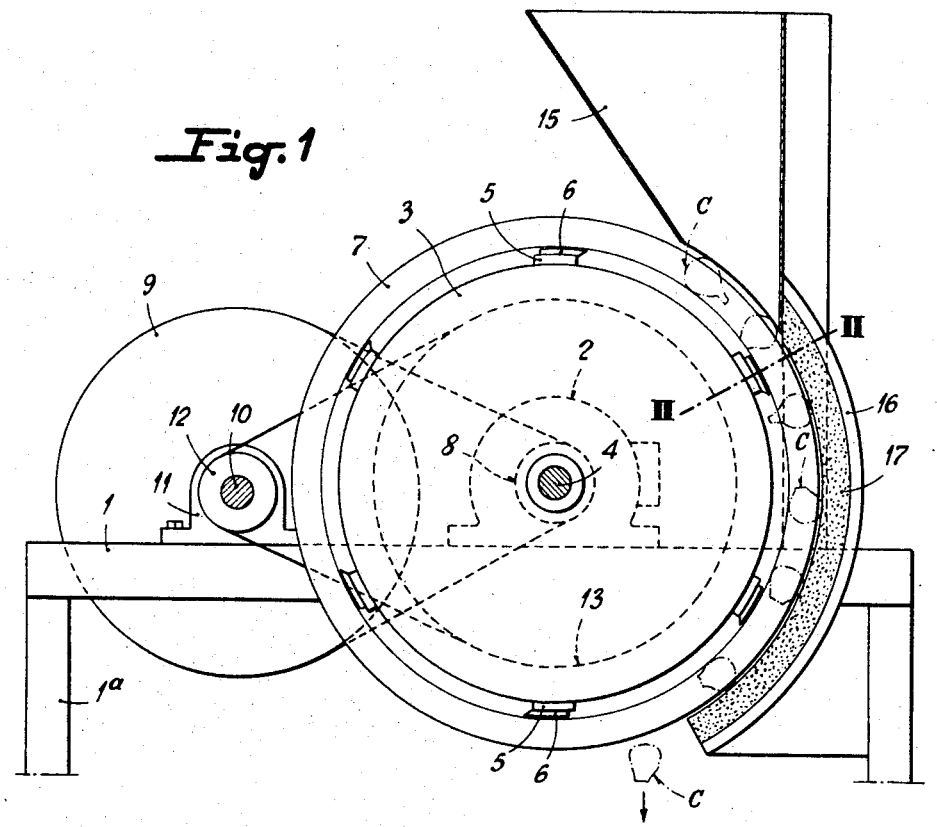
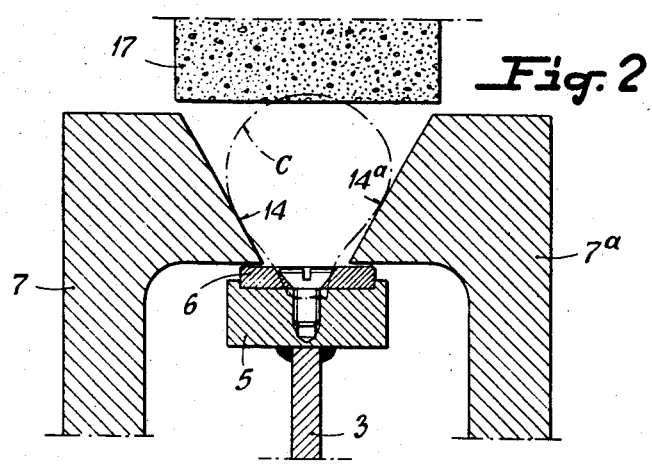

United States Patent Office 3,400,740
Patented Sept. 10, 1968

3,400,740
VEGETABLE TRIMMING APPARATUS
Yngve R. Åkesson, Halsingborg, Sweden, assignor to Produits Findus S.A., Vevey, Switzerland, a corporation
Filed July 6, 1966, Ser. No. 563,236
Claims priority, application Switzerland, July 8, 1965, 9,549/65
10 Claims. (Cl. 146—81)

ABSTRACT OF THE DISCLOSURE

An apparatus for trimming vegetables, particularly Brussels sprouts, having movable cutters and a channel parallel to the path of the cutters formed from a guide and a holding slide, one of which is movable relative to the other to impart to the vegetables, simultaneously, a rolling over and a translational movement along the channel.

---

The present invention is concerned with an apparatus for trimming vegetables, especially Brussels sprouts.

The preparation of Brussels sprouts, after these have been severed from their stalk, involves removal of the stem which links the sprout to the stalk and of one or more outer leaves which are usually hard and sometimes mouldy.

It is an object of the present invention to mechanize this operation, which up to now has generally been done by hand.

The present invention provides an apparatus for trimming vegetables, particularly Brussels sprouts, comprising, in combination, at least one movable cutter, guiding means extending over at least part of the path defined by said cutter and forming, parallel to the path of said cutter, a channel in which the vegetables are moved at a definite distance from the cutter, and holding means for maintaining the vegetables in said channel, one of said two means being movable relative to the other thereby to impart simultaneously to the vegetables a rolling over and a translational movement along said channel.

Preferably, the apparatus according to the invention includes a rotary cutter, guiding means extending for at least a segment of the circle described by the cutter and forming, in parallel with the circular path of the cutter, a channel in which the vegetables are moved, and holding means which are at least in part concentric with said channel.

In one preferred embodiment of the invention, the rotary cutter is a wheel carrying at its periphery a series of cutting blades and the guiding means are composed of two rimmed discs surrounding said wheel, each having, at their periphery, a taper towards the blade-carrying wheel, thus providing a channel which is trapezoidal in section.

A preferred form of the apparatus in accordance with the present invention will now be described with reference to the accompanying drawing in which:

FIGURE 1 is an elevation, partially in section, schematically illustrating the apparatus.

FIGURE 2 is a section along line II—II of FIGURE 1.

Referring to FIGURES 1 and 2 of the drawing, the apparatus comprises a base 1 supported on feet 1a. An electric motor 2 is mounted at one end of the base 1, and is intended for driving various parts of one or more cutting devices arranged in line along the base 1, only one of these devices being represented.

Each cutting device comprises essentially two movable elements and a fixed part integral with the chassis 1. The movable elements are respectively a rotary cutter driven directly by the motor 2 and guiding means surrounding said cutter which are rotated by means of a reduction gear.

The rotary cutter consists of a metal wheel 3 mounted on a shaft 4 which is fitted on the end of the shaft of the motor 2. The wheel 3 is provided on its periphery with a number of plates 5 on each of which a cutting blade 6 is removably mounted.

The guiding means are formed by two rimmed discs 7, 7a, integral with each other and encasing the rotary cutter in a drum shaped chamber. The discs rotate freely relative to the shaft 4 and are rotated by chain drives which comprise:

A sprocket 8 mounted on the shaft of the motor 2,
A wheel 9 fixed to a shaft 10, which is journalled on two bearings 11 fixed to the base 1,
A sprocket 12 integral with shaft 10 and
A wheel 13 integral with disc 7.

These drives are such that the peripheral speed of said discs is much smaller that the speed of the cutters.

The inner wall of the discs 7, 7a is hollow thereby to form said chamber above which said discs have tapering faces 14 and 14a which flare outwardly so that the channel which they define is trapezoidal in section. The size of the cut at the base of the vegetables is determined by the distance between the blades 6 and the bottom of the said channel, as well as by the width of the latter, which fixes the relative positions of the vegetables and the cutters. The width of the channel may be set by means of a setting device (not shown) whereby the position of the discs relative to each other may be modified.

Brussels sprouts C are unloaded into hopper 15 supported on the base 1 which opens into the channel between the discs 7, 7a. The sprouts are thus rotated; their angular displacement with respect to the cutters, which is in the same direction, is less than 180°. According to the invention, each sprout C is impelled by the discs 7, 7a so as to roll over several times in order that at least once during its movement through said channel it is oriented in a way such that its base projects into the chamber where the rotary cutter rotates, and its tail is cut off by one of the blades 6.

The rolling motion of the sprouts on the faces 14, 14a of the channel is imparted by means of a fixed slide which is integral with the base 1 and is attached at one of its ends to the rear wall of the hopper 15. The slide 16 is in the shape of a ring segment concentric with said discs and is placed below the opening of the hopper; its length determines the magnitude of the displacement of the vegetables along the guiding means. The wall of the slide 16 adjacent thereto is lined with a layer 17 of a resilient material, such as for example rubber or plastic foam. This layer provides a sort of ceiling for the channel in which the vegetables are carried. The vegetables are thus maintained in contact with the discs 7, 7a and, because of the translational motion and the adherence of the resilient material, the layer also imparts to the vegetables a rolling movement over the whole length of their path.

According to another embodiment (not shown), the guiding means may be provided by one or more fixed members forming at least a segment of a circle and providing at their periphery a trapezoidal groove the bottom of which, located opposite the cutters, is open at least over a part of their length. In this case, the fixed slide is replaced by a rotary ring adapted to carry the vegetables in said groove.

According to a further embodiment of the invention, the cutter comprises a plurality of blades moving rectilinearly, continuously or discontinuously, at a fixed distance from an immobile channel. In this case, the apparatus comprises movable holding means, for example a ribbon or belt of resilient material, which moves parallel to said channel.

In another preferred embodiment to the invention, the apparatus comprises several cutting devices of the type described above and means for sorting the vegetables according to size, each of said cutting devices treating vegetables only of a particular size. These devices may be arranged in line along the shafts 4 and 10 and each of the hoppers 15 is fed from the sorting equipment by means of a suitable conveyor belt.

What is claimed is:

1. An apparatus for trimming vegetables, particularly Brussels sprouts, comprising, in combination, at least one movable cutter, guiding means extending over at least part of the path defined by said cutter and forming, parallel to the path of said cutter, a channel in which the vegetables are moved at a definite distance from the cutter, and holding means continuously engaging the vegetables in said channel for maintaining the vegetables therein, one of said means being movable relative to the other thereby to impart simultaneously to the vegetables a rolling over and a translational movement along said channel.

2. An apparatus according to claim 1 comprising, in combination, a rotary cutter, guiding means extending for at least a segment of the circle described by the cutter and forming, parallel to said circle, a channel in which the vegetables are moved and holding means which are at least in part concentric with said channel.

3. An apparatus for trimming vegetables, particularly Brussels sprouts comprising, in combination, a plurality of cutting blades, a wheel carrying at its periphery said cutting blades to form a rotary cutter, guiding means extended for at least a segment of the circle described by the cutter and forming, parallel to said circle, a channel in which the vegetables are moved at a definite distance from the cutter, and holding means at least in part concentric with said channel for holding the vegetables therein, one of said means being movable relative to the other thereby to impart to the vegetables a rolling over and a translational movement along said channel.

4. An apparatus according to claim 3 in which the guiding means comprises two rimmed discs surrounding the wheel, each having, at its periphery, a taper towards the blade carrying wheel, thus providing a channel which is trapezoidal in section.

5. An apparatus according to claim 4 in which said discs are adapted to rotate in the same direction as the blade carrying wheel.

6. An apparatus according to claim 5 in which the angular speed of the discs is substantially smaller than that of the blade carrying wheel.

7. An apparatus for trimming vegetables, particularly Brussels sprouts comprising, in combination, a rotary cutter, guiding means extending for at least a segment of the circle described by the cutter and having at least one fixed circular member forming at its periphery a groove of trapezoidal section the bottom of which, located opposite the cutters, is open over at least a part of the circumference of said circular member, said guiding means forming a channel in which the vegetables are moved at a definite distance from the cutter, and holding means at least in part concentric with said channel for maintaining the vegetables therein, one of said means being movable relative to the other thereby to impart simultaneously to the vegetables a rolling over and a translational movement along said channel.

8. An apparatus according to claim 7 in which the guiding means comprise at least one member forming a circular segment comprising a trapezoidal groove the bottom of which, opposite the cutters, is open over at least a part of its length.

9. An apparatus for trimming vegetables, particularly Brussels sprouts comprising, in combination, a rotary cutter, guiding means extending for at least a segment of the circle described by the cutter and forming, parallel to said circle, a channel in which the vegetables are moved at a definite distance from the cutter, and holding means formed by a fixed slide having the shape of a ring segment at least in part concentric with said channel, said slide having an internal face which provides the ceiling of said channel, one of said means being movable relative to the other thereby to impart simultaneously to the vegetables a rolling over and a translational movement along said channel.

10. An apparatus according to claim 9 in which the internal face of the slide is lined with a layer of resilient material.

References Cited

UNITED STATES PATENTS

| 2,793,665 | 5/1957 | Pinard | 146—81 |
| 3,174,520 | 3/1965 | Van Der Vijver | 146—83 |
| 3,229,740 | 1/1966 | Alvarez | 146—28 X |
| 3,273,616 | 9/1966 | Petersen | 146—28 |

W. GRAYDON ABERCROMBIE, *Primary Examiner.*